No. 717,162. Patented Dec. 30, 1902.
J. CAMPBELL.
APPARATUS FOR HANDLING COAL OR OTHER MATERIAL.
(Application filed Nov. 20, 1901.)

(No Model.) 4 Sheets—Sheet 1.

Fig. I.

WITNESSES. INVENTOR.

No. 717,162. Patented Dec. 30, 1902.
J. CAMPBELL.
APPARATUS FOR HANDLING COAL OR OTHER MATERIAL.
(Application filed Nov. 20, 1901.)
(No Model.) 4 Sheets—Sheet 3.

UNITED STATES PATENT OFFICE.

JEREMIAH CAMPBELL, OF NEWTON, MASSACHUSETTS.

APPARATUS FOR HANDLING COAL OR OTHER MATERIAL.

SPECIFICATION forming part of Letters Patent No. 717,162, dated December 30, 1902.

Application filed November 20, 1901. Serial No. 83,005. (No model.)

*To all whom it may concern:*

Be it known that I, JEREMIAH CAMPBELL, a citizen of the United States, and a resident of Newton, in the county of Middlesex and State of Massachusetts, have invented a new and useful Improvement in Apparatus for Handling Coal or other Material, of which the following is a full, clear, and exact description, reference being had to the accompanying drawings, forming a part of this specification, in explaining its nature.

The subject-matter of this application was originally shown, described, and claimed in my application for Letters Patent of the United States for apparatus for handling coal and other material, filed July 13, 1901, Serial No. 68,166, and was removed therefrom by amendment.

The invention relates to that type of apparatus for handling coal or other material which employs a horizontal boom supported by a tower and extending crosswise the tower any desired distance from either side thereof, from any part of which is operative a trolley mounted upon said boom to traverse any part of it and a grab or similar conveyer which is vertically movable with respect to the trolley while it is being actuated, and it comprises the employment in conjunction with said boom, trolley, and grab means for suspending from said boom at any desired height a hopper and for moving it lengthwise the boom to any desired position and which is used in conjunction with the grab as a device for receiving coal or other material delivered to it by the grab and for delivering it to a chute or other receptacle.

The invention also involves the construction of the boom, whereby the hopper-truck may travel thereon as well as the trolley.

Figure 1:
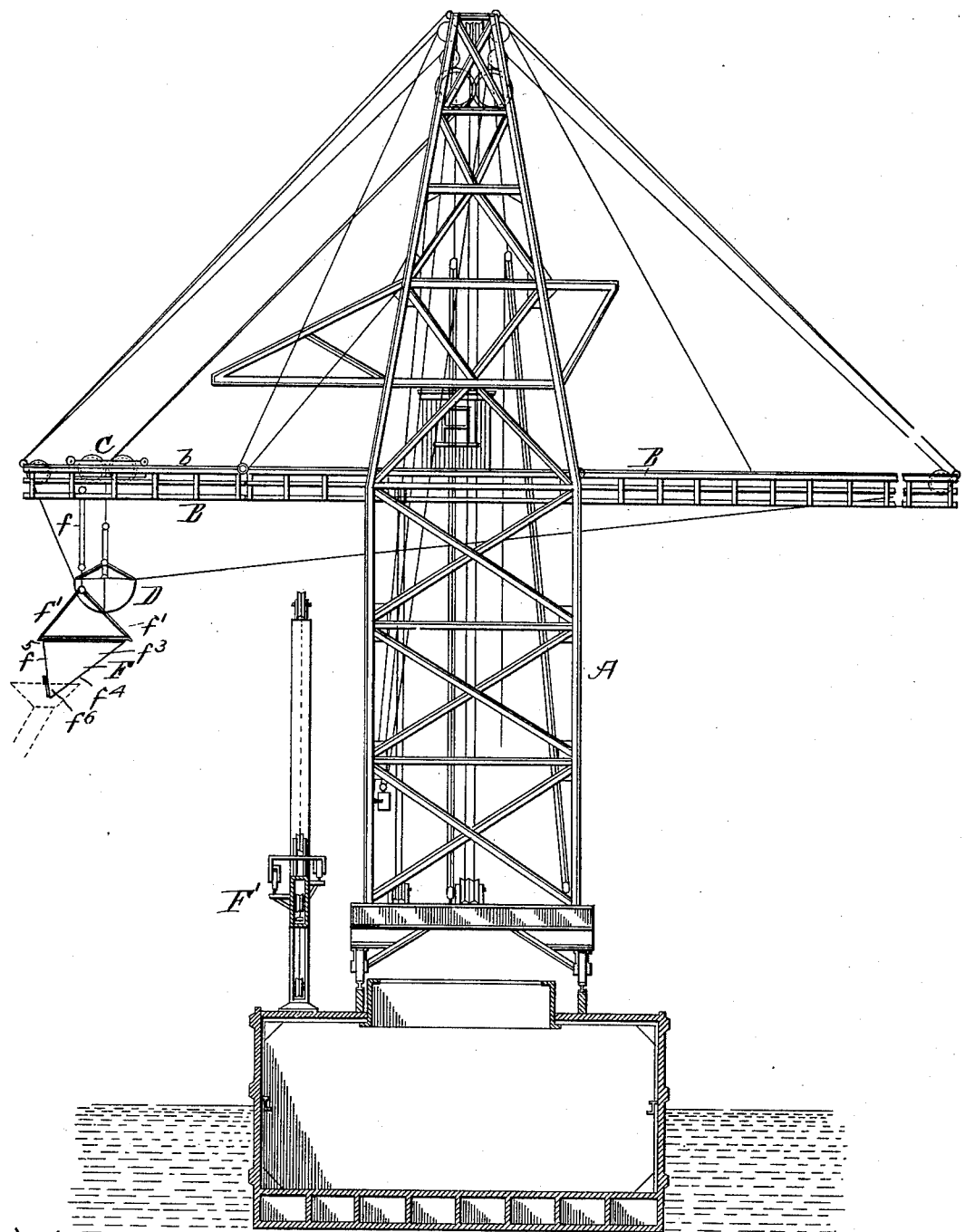
Figure 2:
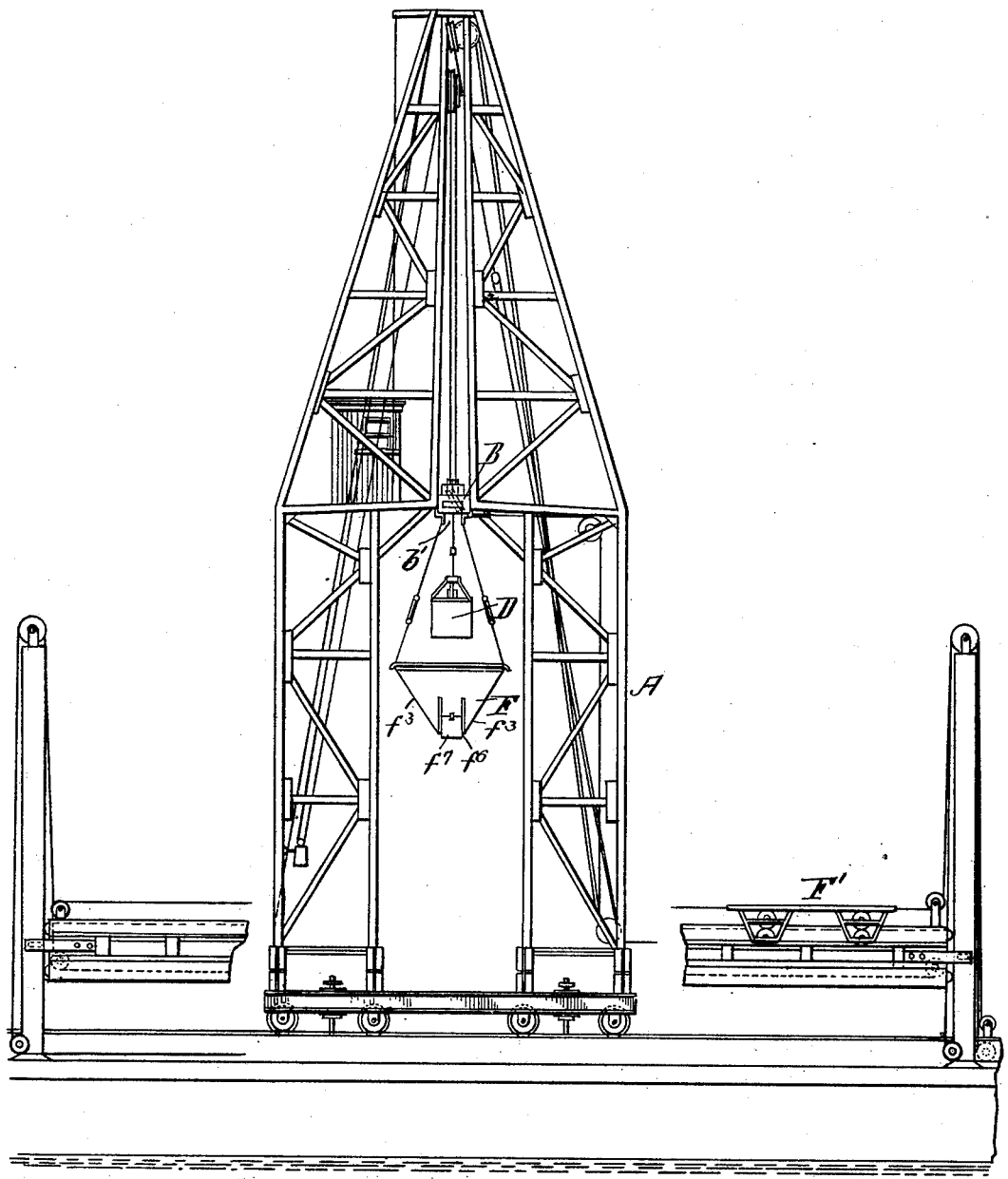
Figure 3:
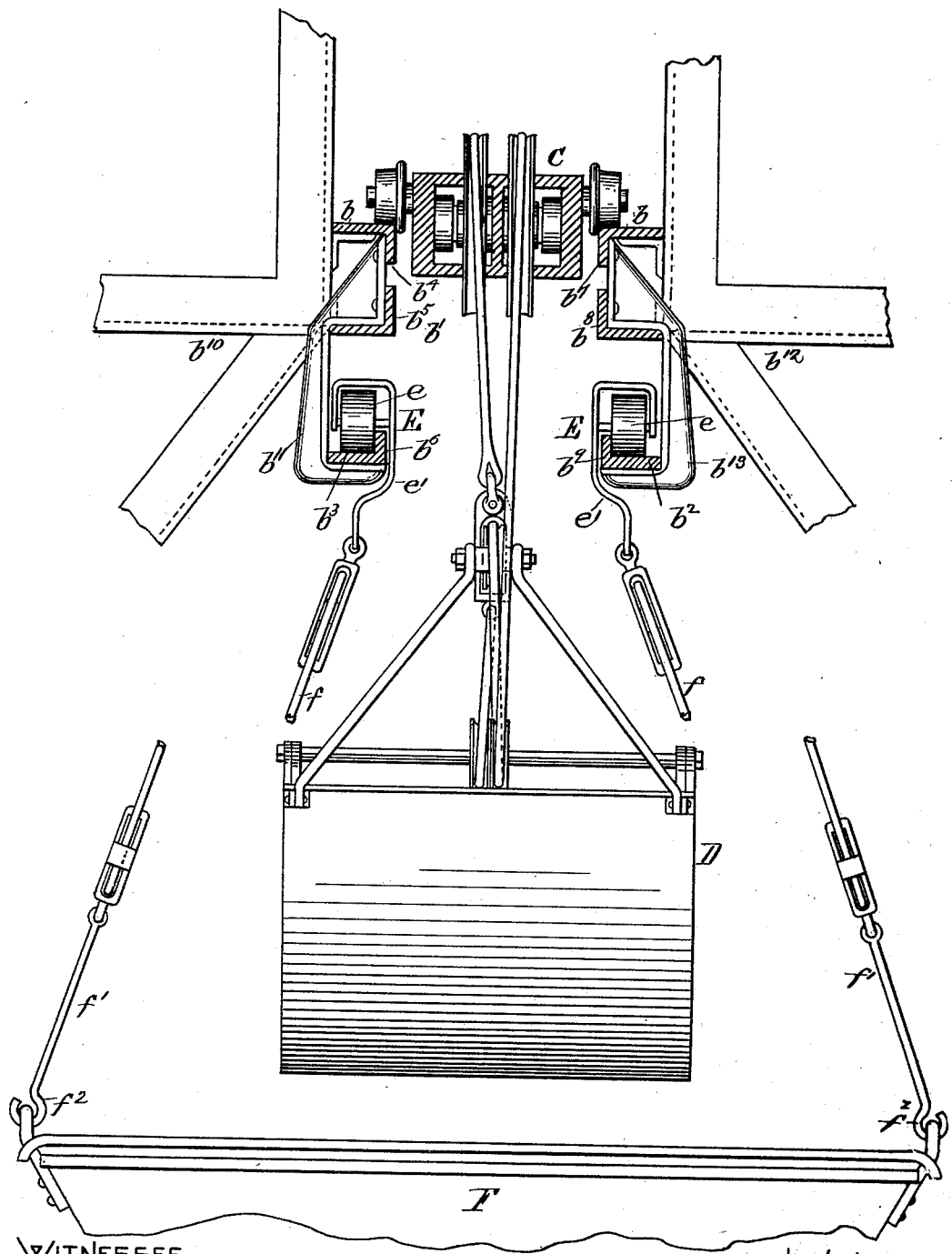
Figure 4:
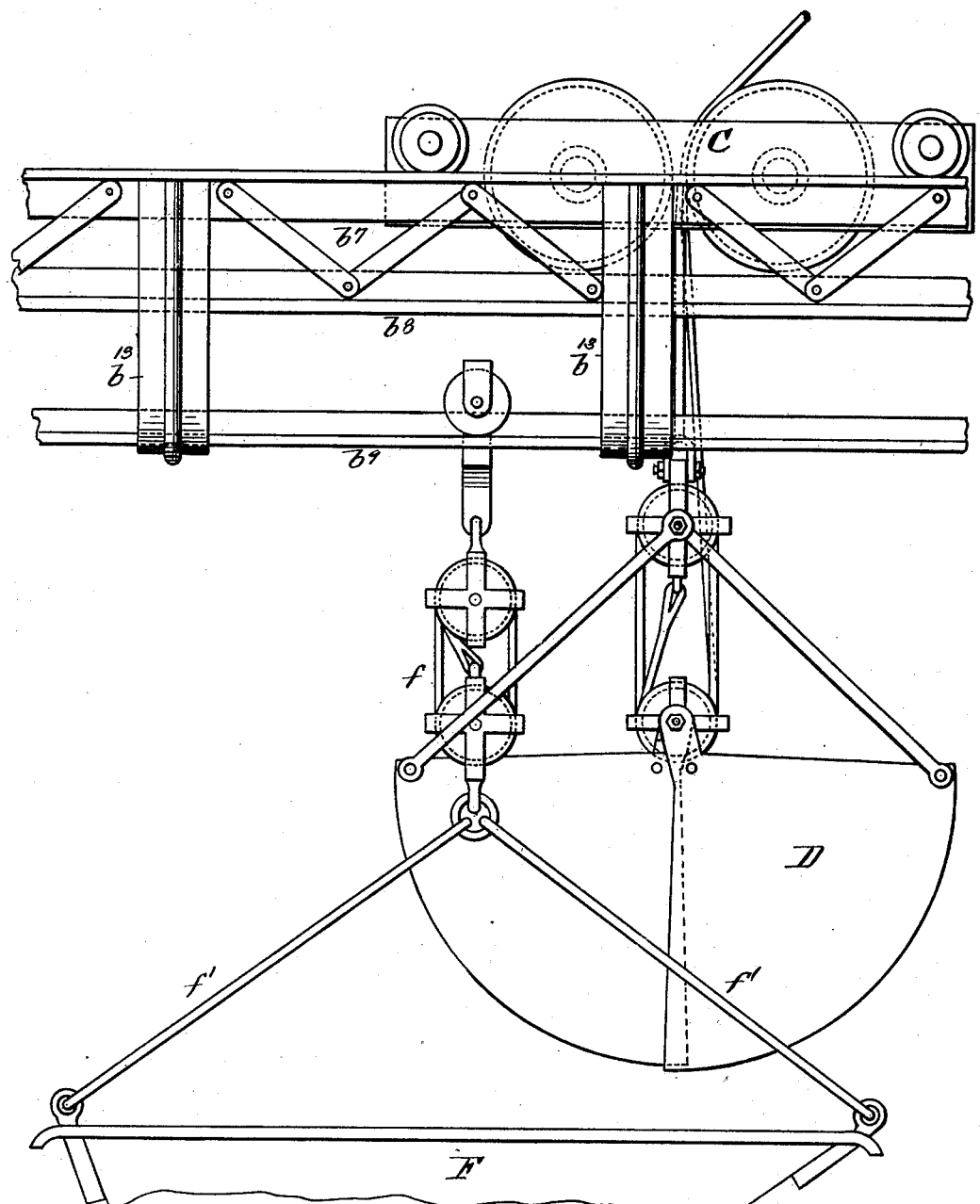

In the drawings, Figure 1 is a view, principally in elevation, of a coal-handling apparatus of the character specified mounted upon a lighter. Fig. 2 is a view thereof, principally in side elevation. Fig. 3 is a view, principally in vertical cross-section, enlarged, to show the boom, trolley, hopper-truck, rails for the same, the grab, and a part of the hopper. Fig. 4 is a view enlarged, in side elevation principally, of the parts represented in Fig. 3.

Referring to the drawings, A is the tower; B, the boom supported thereby and extending from each side thereof.

C is the trolley movable upon any part of the boom, and D is the grab, which is vertically movable with respect to the trolley. The trolley and grab are operated in the usual manner, and the trolley travels upon the tracks $b$ of the boom. The boom is constructed to provide a continuous opening $b'$ throughout its length, and also the tracks $b^2$ $b^3$ for the truck E, from which the hopper F is suspended. I prefer to construct the boom of the angle-stringers $b^4$ $b^5$ $b^6$ $b^7$ $b^8$ $b^9$, the stringers $b^4$, $b^5$, and $b^6$ serving to form a portion of one side of the boom and the stringers $b^7$, $b^8$, and $b^9$ a portion of the other side of the boom. The stringers $b^4$ and $b^5$ are attached by angle-cleats to the braced studs $b^{10}$, and the angle-stringer $b^6$ is suspended from the said angle-stringers $b^4$ and $b^5$ by brackets $b^{11}$. The angle-stringers $b^7$ and $b^8$ are attached by angle-cleats to the braced studs $b^{12}$, and the angle-stringer $b^9$ is suspended from the angle-stringers $b^7$ and $b^8$ by the brackets $b^{13}$. It will thus be seen that one complete side of the boom comprises the angle-stringers $b^4$, $b^5$, and $b^6$, their connecting-brackets, and the means for fastening them to the studding on that side, while the other side of the boom consists of the angle-stringers $b^7$, $b^8$, and $b^9$ and their brackets $b^{13}$ and the means for attaching them to the studding $b^{10}$. It will further be seen that the two sides of the boom are separated from each other throughout their length by an unobstructed space in which the grab-ropes are moved upon the movement of the trolley. The angle-stringers $b^6$ and $b^9$ form tracks for the hopper-truck rolls and also guards for them. The angle-stringers $b^4$ and $b^5$ of one boom side and $b^7$ and $b^8$ of the other boom side may be tied together and braced by diagonal bracing-bars. (See Fig. 4.)

The hopper-truck E is in two parts, each comprising a roll $e$, which supports an arm $e'$, the upper part of which is shaped to provide a bearing for the roll and the lower part of which extends below the truck-track and is provided with means for attachment to it of a suspending tackle or device by means of which the hopper F is attached to the truck and movable vertically with respect to it.

$f$ represents the tackle, the lower end of which has a four-part bridle $f'$, connecting with each corner of the hopper, preferably by means of hooks $f^2$. The hopper may be of any desired shape. The one represented has the inclined sides $f^3$, the inclined bottom $f^4$, and the very nearly vertical side $f^5$, in which is the discharge-outlet $f^6$, controlled by a gate $f^7$. The hopper when not suspended from the boom may be used upon the truck F', shaped to receive it and which is then employed in conjunction with the trolley and grab, as described in my said application.

In use the trolley, if detached from the trolley-truck upon the boom, is attached to it and at any height desired and is then moved by means of its truck upon the boom to any desired position, where the truck is made fast to the boom and with its outlet in suitable relation to a chute or other receiver and its opening so related to the under surface of the boom that the grab may be moved over it by the grab-trolley and its contents discharged into the suspended hopper.

The invention is especially useful in conjunction with the loading of steamships having side bunkers adapted to be filled through outboard-openings in the side of the vessel and interior bunkers adapted to be fed through openings in the deck. The first requires means for delivering coal at various points and various heights along the side of the vessel and the other requires delivery of coal aboveboard. For the one purpose the hopper detached from its boom-truck and mounted upon the truck which is movable transversely the boom is used. For the other the hopper mounted upon the boom is employed.

I have not described the other details of the invention, as they are described and claimed in the application from which the description of this invention has been taken.

The hangers or arms of the hopper-boom truck are bent to bring their lower ends beneath the center of the rolls in order to provide suitable draft upon the rolls and also a space between the arms in which the grab may be moved to a position over the hopper when the hopper is raised to a position near the ends of the arms.

Having thus fully described my invention, I claim and desire to secure by Letters Patent of the United States—

1. In an apparatus for handling coal or other material, the combination of a boom, a trolley mounted thereon to traverse any portion of it at will, a grab or other conveyer vertically movable with respect to the trolley, a hopper truck or support movable upon said boom, and a hopper suspended from said truck or support.

2. In an apparatus for handling coal or other material, a boom having two sets of tracks, one for supporting the trolley and one for supporting a hopper-truck, a trolley movable upon its boom-tracks, a hopper-truck movable upon its boom-tracks, a grab or conveyer vertically movable with respect to the trolley, and a hopper suspended from the hopper-truck.

3. In an apparatus for handling coal and other material, the combination of a boom having trolley-tracks thereon and also having hopper-truck tracks parallel with and below the trolley-tracks, a trolley mounted upon the trolley-tracks, a grab or other conveyer carried thereby, a hopper-truck mounted upon the hopper-truck tracks, and a hopper suspended from it, the hopper tracks and trucks and the hopper being so arranged that the grab or other conveyer may be moved by its trolley over the hopper as and for the purposes set forth.

4. In an apparatus for handling coal and other material, the combination of a boom, a trolley movable thereon, a hopper-truck movable thereon, a grab or conveyer vertically movable with respect to the trolley, a vertically-movable beam or girder below the boom, extending crosswise it, a truck mounted upon it to travel lengthwise it and a detachable hopper adapted either to be suspended from the boom-hopper truck or to be borne by the girder-truck and to permit in either connection the movement of the grab or conveyer to a discharging position over it.

5. In an apparatus for handling coal or other material, a boom having two sides independently supported and separated from each other throughout their operative length, each of which sides has two tracks, one above the other.

6. In an apparatus for handling coal or other material, a metal boom having two sides, each consisting of three lines of angle-stringers united together and attached to supports substantially as specified and shaped to provide two sets of tracks, the lower of which has outer guards.

7. In an apparatus for handling coal or other material, a boom having tracks for supporting a hopper-truck, said truck being made in two parts, one for each track, and a hopper suspended from the said truck.

JEREMIAH CAMPBELL.

Witnesses:
F. F. RAYMOND, 2d,
SAUL SIPPERSTEIN.